United States Patent

[11] 3,570,534

[72] Inventor Herman Beavers
5585 Garden St., Maple Heights, Ohio 44137
[21] Appl. No. 771,869
[22] Filed Oct. 30, 1968
[45] Patented Mar. 16, 1971

[54] CONNECTION BLOCK FOR THE HYDRAULIC LINES OF A DUAL BRAKING SYSTEM ON AUTOMOTIVE VEHICLES
4 Claims, 4 Drawing Figs.
[52] U.S. Cl. .................................................. 137/594
[51] Int. Cl. .................................................. F16k 11/00
[50] Field of Search .................................... 137/561,
561.1, 594; 188/152.02; 303/6; 60/54.5, 54.6
(Inquired)

[56] References Cited
UNITED STATES PATENTS
| | | | |
|---|---|---|---|
| 3,072,148 | 1/1963 | CARLS | 137/561X |
| 3,411,298 | 11/1968 | Sorensen | 60/54.5 |

*Primary Examiner*—M. Cary Nelson
*Assistant Examiner*—R. B. Rothman

ABSTRACT: This invention consists of a rectangular metal block having two openings in one side, an opening in each end, and one opening in the other side. It also has two openings in the top of the aforesaid block. The aforesaid openings in the rear of the block are known to be L-shaped and in the form of tubular legs when viewed from the top and the opening in the front of the block is also shown to be in the form of tubular legs that are T-shaped when viewed from the top. The rear top opening enters into the L-shaped opening while the front top opening enters the T-shaped opening.

Patented March 16, 1971
3,570,534
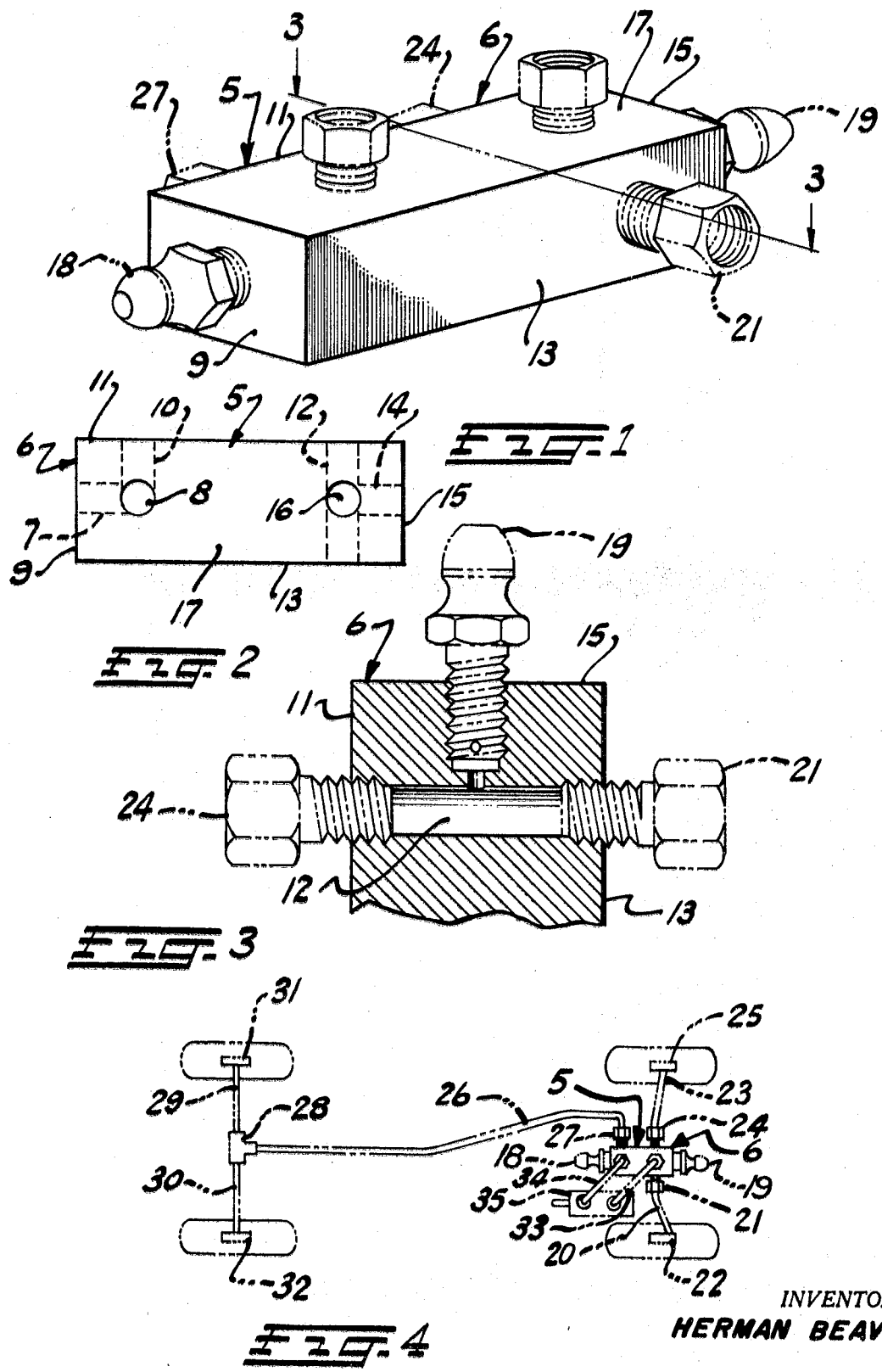
INVENTOR
HERMAN BEAVERS

CONNECTION BLOCK FOR THE HYDRAULIC LINES OF A DUAL BRAKING SYSTEM ON AUTOMOTIVE VEHICLES

This invention relates to automotive vehicles; more particularly, to the hydraulic system of an automotive vehicle; still more particularly, to a means of separating the front wheel braking system from the back wheel braking system by means of a connection block, as will hereinafter be described.

It is the principal object of this invention to provide a connection block for hydraulic lines of a dual braking system on automotive vehicles that will, as the name suggests, separate the front wheel braking system from that of the rear wheel braking system by means of a single connection block that connects the master cylinder of the braking system with the wheel cylinders.

Another object of this invention is to provide a connection block for hydraulic lines of a dual braking system on automotive vehicles that permits a pressure valve to be connected to each end of the block for removing air from the wheel cylinders and hydraulic lines independently of each of the two braking systems of the vehicle.

Still another object of this invention is to provide a connection block for hydraulic lines of a dual braking system on automotive vehicles that simplifies the two braking systems of a vehicle, as will be understood by those experienced in the art, as well as providing increased safety for the vehicle and its passengers by separating the two braking systems with a single connection block.

For further objects, advantages, and comprehension of this invention, reference is made to the accompanying drawing and the appended claims in which the various novel features of the invention are more particularly set forth.

In the accompanying drawing forming a material part of this disclosure:

FIG. 1 is a pictorial view of this invention having its necessary fittings screwed therein. The fittings are shown in phantom lines.

FIG. 2 is a top view of this invention.

FIG. 3 is a sectional view of a portion of one end of this invention, taken substantially along line 3-3 of FIG. 1, and viewed in the direction indicated by the arrows.

FIG. 4 is a top view of this invention connected by hydraulic lines to the four wheel cylinders of an automotive vehicle. Only the actual invention is shown in solid black lines. All other related parts are drawn in phantom lines since no claim is made for the same.

In the several views of the accompanying drawing, like parts of this invention and like associated parts are indicated by like reference numbers.

The reference number 5 indicates this invention in its entirety.

Looking first at FIG. 1 of the accompanying drawing, it will be seen that this invention consists of a rectangular block of metal 6 having an opening that is L-shaped when viewed from the top in one end therein, and a second opening that is T-shaped when viewed from the top in the other end thereof. The first-mentioned opening embodies a tubular leg 7 that extends longitudinally from the top opening 8 to the rear end 9 of the block. A second tubular leg 10 extends outward from the aforesaid top opening 8 in the block to the side 11 of the block. The second-mentioned opening embodies a tubular leg 12 that extends clear through the aforesaid block 6 from side 11 to the opposite side 13 of the same block. A tubular leg 14 extends from the center of the aforesaid leg or passage 12 to the front end 15 of the often mentioned block 6. A top opening 16 extends downward from the top 17 of the block to terminate in the intersection of the aforesaid legs 12 and 14, thereby completing the construction of this invention. It is to be realized that all of the openings in the aforesaid block 6 are to be provided with internal threads for the reception of the hydraulic fittings.

Examination of FIGS. 1, 3, and 4 of the accompanying drawing shows that with the exception of the fittings in each end of the aforesaid block 6, all of the fittings are of the type known to those experienced in the art as flair nuts, while the two end fittings are pressure valves 18 and 19.

The way in which this invention of a connection block is connected into the two braking systems of an automotive vehicle is clearly shown in FIG. 4 of the drawing. Here it is seen that a hydraulic line 20 has one end secured to the flair nut 21 which is screwed into that end of the aforesaid tubular leg 12 that is in the side 13 of the block 6, while the other end of the aforesaid hydraulic line 20 terminates in right front wheel hydraulic cylinder 22. Hydraulic line 23 has one end secured to the flair nut 24 that is screwed in the other end of the aforesaid tubular leg 12 that terminates in the side 11 of block 6, while the outer end of the last-mentioned hydraulic line terminates in the left front wheel hydraulic cylinder 25. Hydraulic line 26 has one end secured to the flair nut 27 which is screwed into that end of the tubular leg 10 which terminates in side 11 of block 6. The other end of line 26 terminates in the T-shaped connector 28 whose hydraulic lines 29 and 30 are connected to the two rear wheel cylinders 31 and 32. Hydraulic lines 33 and 34 connect the aforesaid connector block 6 with the master cylinder 35 of the automobile braking systems, as will be understood by those experienced in the art upon examination of the already mentioned FIG. 4 of the accompanying drawing.

It is to be understood that by means of this invention of mine, all air can be removed from the wheel cylinders 22, 25, 31, and 32, and also from the master cylinder 35 by using a small plastic Y-shaped hose having two short hoses that are approximately 4 to 6 inches in length. The aforesaid short hose pushes on the end of each pressure valve terminating in one hose that goes back into the top of the aforesaid master cylinder 35. By the operator of the vehicle releasing a little pressure on the valves and pumping the brake pedal, all of the air will be forced out of the system, as will be understood by those experienced in the art upon examination of the accompanying drawing. This will all be accomplished without one loosing any of the fluid that is used in the hydraulic system. The aforesaid Y-shaped hose and valves are not shown in any of the views of the drawing for reasons of clarity.

As nearly anyone experienced in the art knows, at the present time, and on present brake systems, one must place the vehicle on a lift and raise the vehicle up in order that the mechanic can get under the car in order to remove air from both the wheel and master cylinders. This takes time and is costly. This invention of mine will obviously permit the work to e done without lifting the vehicle off the ground. All one will have to do is to pull over on the side of the road, or in ones own garage or backyard and lift the hood of the vehicle and then let the air out of the two aforesaid pressure valves 18 and 19, valves that are located one on each end of the aforesaid rectangular block 6 of this invention.

This invention, whose construction and usage I have now described, is subject to any changes and/or modifications one may care to make in the same in so long as the changes and/or modifications fall within the scope and intent of the appended claims.

I claim:

1. A connector block for the hydraulic lines of a dual braking system on an automotive vehicle, comprising a block of metal, at each end of said block a plurality of tubular legs extend into said block at angles to each other, the inner ends of the legs at either end of the block extending to and communicating with each other, the outer ends of each tubular leg having internal threads, externally threaded pressure valves threaded into one leg at each end of the block, an externally threaded fitting adapted to receive the end of a hydraulic line threaded into each of the remaining legs.

2. The invention of claim 1, wherein the block is rectangular in configuration and at one end of the block, one leg extends downward from the top of the block, another leg extends inward from the end of the block and a third leg extends inward from one side of the block.

3. The invention of claim 2, wherein at the other end of the block, one leg extends downward from the top of the block, another leg extends inward from the end of the block and two legs extend inward from opposite sides of the block.

4. The invention of claim 3, wherein the pressure valves are threaded into the legs which extend inward from the ends of the block.